(12) United States Patent
Kondo

(10) Patent No.: US 7,589,913 B2
(45) Date of Patent: Sep. 15, 2009

(54) LENS DEVICE AND IMAGING DEVICE

(75) Inventor: Shigeru Kondo, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/197,707

(22) Filed: Aug. 25, 2008

(65) Prior Publication Data
US 2009/0086337 A1    Apr. 2, 2009

(30) Foreign Application Priority Data
Sep. 28, 2007 (JP) ............................. 2007-254307

(51) Int. Cl.
*G02B 15/14* (2006.01)
(52) U.S. Cl. ..................... 359/699; 359/684; 396/72
(58) Field of Classification Search ......... 359/699–704, 359/823, 683–688, 676, 696; 396/72, 84, 396/85, 148, 386; 348/344, 360
See application file for complete search history.

(56) References Cited

U.S. PATENT DOCUMENTS

| | | | | |
|---|---|---|---|---|
| 4,136,939 A | * | 1/1979 | Abe | ............................. 396/111 |
| 4,967,219 A | * | 10/1990 | Morisawa et al. | ............. 396/84 |
| 7,180,542 B2 | * | 2/2007 | Iwasawa et al. | .......... 348/240.3 |
| 7,471,888 B2 | * | 12/2008 | Maeda et al. | .................. 396/72 |
| 7,499,224 B2 | * | 3/2009 | Nishimura | ................... 359/684 |
| 7,502,171 B2 | * | 3/2009 | Morooka et al. | ............. 359/676 |
| 7,508,593 B2 | * | 3/2009 | Nishimura | ................... 359/684 |
| 7,515,352 B2 | * | 4/2009 | Arai | ........................... 359/687 |

FOREIGN PATENT DOCUMENTS

JP    2005-351930 A    12/2005

* cited by examiner

*Primary Examiner*—Loha Ben
(74) *Attorney, Agent, or Firm*—Sughrue Mion, PLLC

(57) ABSTRACT

An optical path passing through an object-side lens group is bent at a right angle by an optical device so as to be a vertical optical path. A lens group on imaging surface side for forming an image on an imaging surface is disposed on the vertical optical path. The lens group on imaging surface side moves along the vertical optical path, and has a plurality of movable lens groups at least for zooming. The cam plate moves in a direction perpendicular to the vertical optical path within a plane perpendicular to an optical axis of the object-side lens group and not protruding toward an object side compared with the object-side lens group. A plurality of cam slots are formed on the cam plate. The cam slots are fit to a part of the plurality of movable lens groups. In accordance with the movement of the cam plate, the cam slots move the plurality of the movable lens groups such that zooming and focusing are performed.

5 Claims, 7 Drawing Sheets

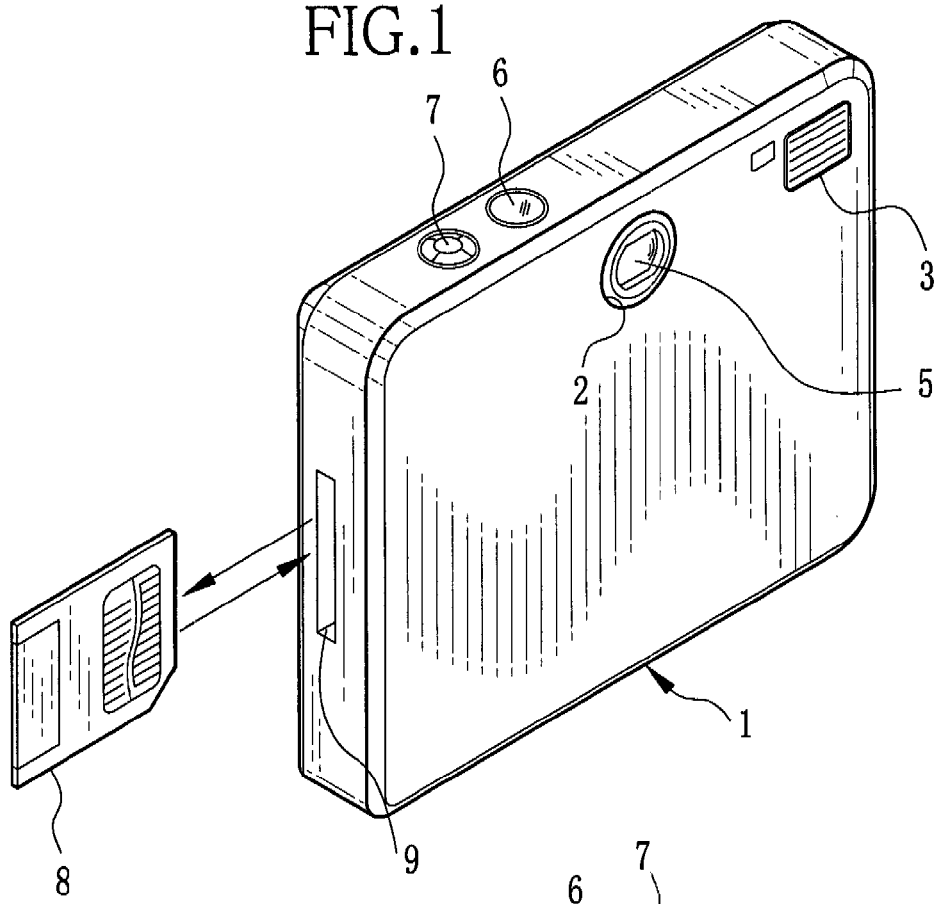
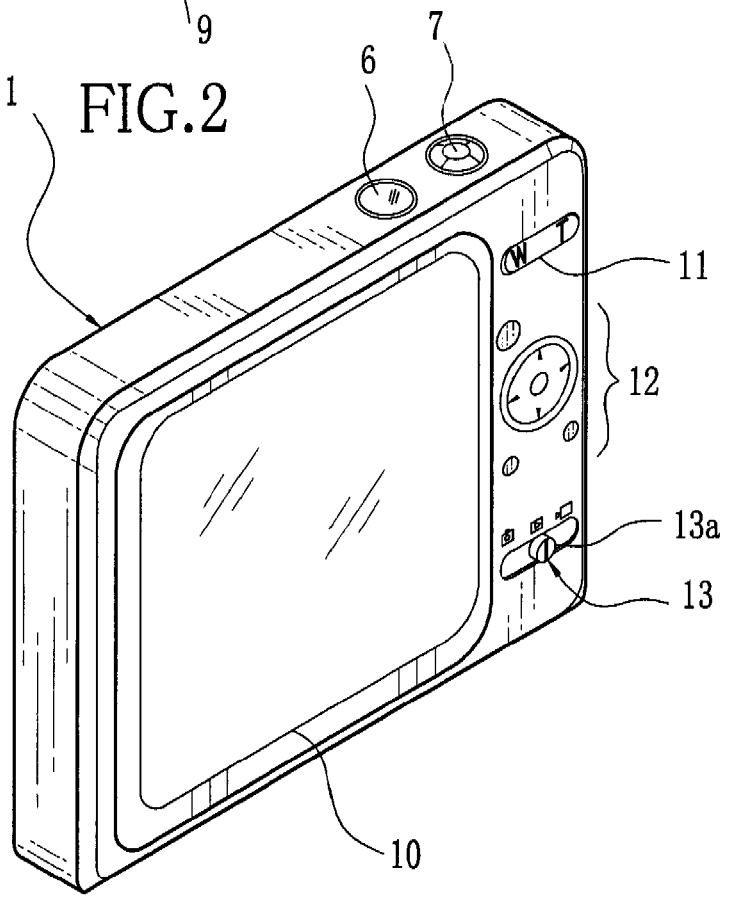

LENS DEVICE AND IMAGING DEVICE

FIELD OF THE INVENTION

The present invention relates to a lens device provided with a path bending optical system, and an imaging device.

BACKGROUND OF THE INVENTION

An imaging device such as a digital camera for imaging a subject and recording image data of the subject on a recording medium has been spread rapidly. Such an imaging device is composed of an imaging optical system such as a zoom lens, a charge-coupled device (CCD) image sensor (solid state imaging device) for converting an optical image into an electric signal, a signal processing circuit for processing an imaging signal outputted from the CCD image sensor and converting the imaging signal to image data, and the like.

The imaging device has been improved in various points so as to satisfy demand for achieving high function of the imaging optical system and demand for downsizing of the imaging device, which are conflicted to each other. As a result of such an improvement, there is known a digital camera incorporating a lens device having a so-called path bending optical system in which optical path is bent by a prism (see Japanese Patent Laid-Open Publication No. 2005-351930).

In the lens device having the path bending optical system, light from an object-side lens facing a subject is bent at a right angle by the prism, and the bent light is focused on an imaging surface of the solid state imaging device by lens groups. The lens groups are disposed such that the optical axes thereof extend in the vertical direction when a camera body is held in a normal position. The lens groups move along the direction of the optical axis (longitudinal direction of the camera body) in accordance with zooming operation. Accordingly, the imaging device adopting the lens device having the path bending optical system is much thinner than conventional imaging devices.

Further, in a digital camera described in Japanese Patent Laid-Open Publication No. 2005-351930, a lens device includes a first section and a second section. The first section houses lens groups. The second section houses two motors aligned in the vertical direction. One of two motors severs for driving the lens groups for zooming, and the other of them serves for driving the lens groups for focusing. The thickness of the second section is made thinner than that of the first section, and a display part such as liquid crystal display (LCD) is arranged to be partially superposed on a rear surface of the second section. Thereby, the total thickness of the digital camera is decreased.

Recently, the demand for further high magnification of the digital camera has been increasing. It has been required to adopt a zoom optical system for driving plural lens groups, in which the number of the movable lens groups is increased. However, the digital camera as described in Japanese Patent Laid-Open Publication No. 2005-351930 has a problem in which one motor is necessary for driving one movable lens group, and therefore when the number of the movable lens groups is increased, the number of the necessary motors is also increased, and thus causing upsizing of the digital camera. Moreover, when a cam ring is used to drive plural movable lens groups, there arises a problem in which the thickness of the digital camera is also increased.

SUMMARY OF THE INVENTION

In view of the above, an object of the present invention is to provide a lens device and an imaging device capable of achieving a zoom optical system for driving plural lens groups without increasing a thickness of the imaging device.

To achieve the above object, a lens device of the present invention includes an object-side lens group, an optical device for bending an optical path, a lens group on imaging surface side, and a cam plate. The lens group on imaging surface side focuses light bent by the optical device on an imaging surface. A plurality of cam slots are formed on the cam plate. The cam slots are fit to the lens group on imaging surface side. The cam plate is movable in a direction perpendicular to an optical axis of the lens group on imaging surface side within a plane perpendicular to an optical axis of the object-side lens group and not protruding toward an object side compared with the object-side lens group. In accordance with the movement of the cam plate, the lens group on imaging surface side moves in a direction of the optical axis at least for the purpose of zooming. Additionally, a lens barrier is attached to the cam plate. The lens barrier covers a front side of the object-side lens while the lens device is not used. The optical device is a triangular prism or a mirror, and bends the light at a right angle in the vertical direction.

According to the lens device and imaging device of the present invention, one cam plate is caused to move the lens group on imaging surface side in the direction of the optical axis at least for the purpose of zooming. Therefore, it is possible to achieve a zoom optical system for driving plural lens groups without increasing the width of the imaging device with a simple structure. Further, since the lens barrier is attached to the cam plate, an actuator dedicated for the lens barrier is unnecessary, thus making it possible to downsize the imaging device and decrease the manufacturing cost thereof.

BRIEF DESCRIPTION OF THE DRAWINGS

One with ordinary skill in the art would easily understand the above-described objects and advantages of the present invention when the following and detailed description is read with reference to the drawings attached hereto:

FIG. 1 is a front perspective view of a digital camera according to the present invention;

FIG. 2 is a rear perspective view of the digital camera;

DESCRIPTION OF THE PREFERRED EMBODIMENTS

Figure 3:
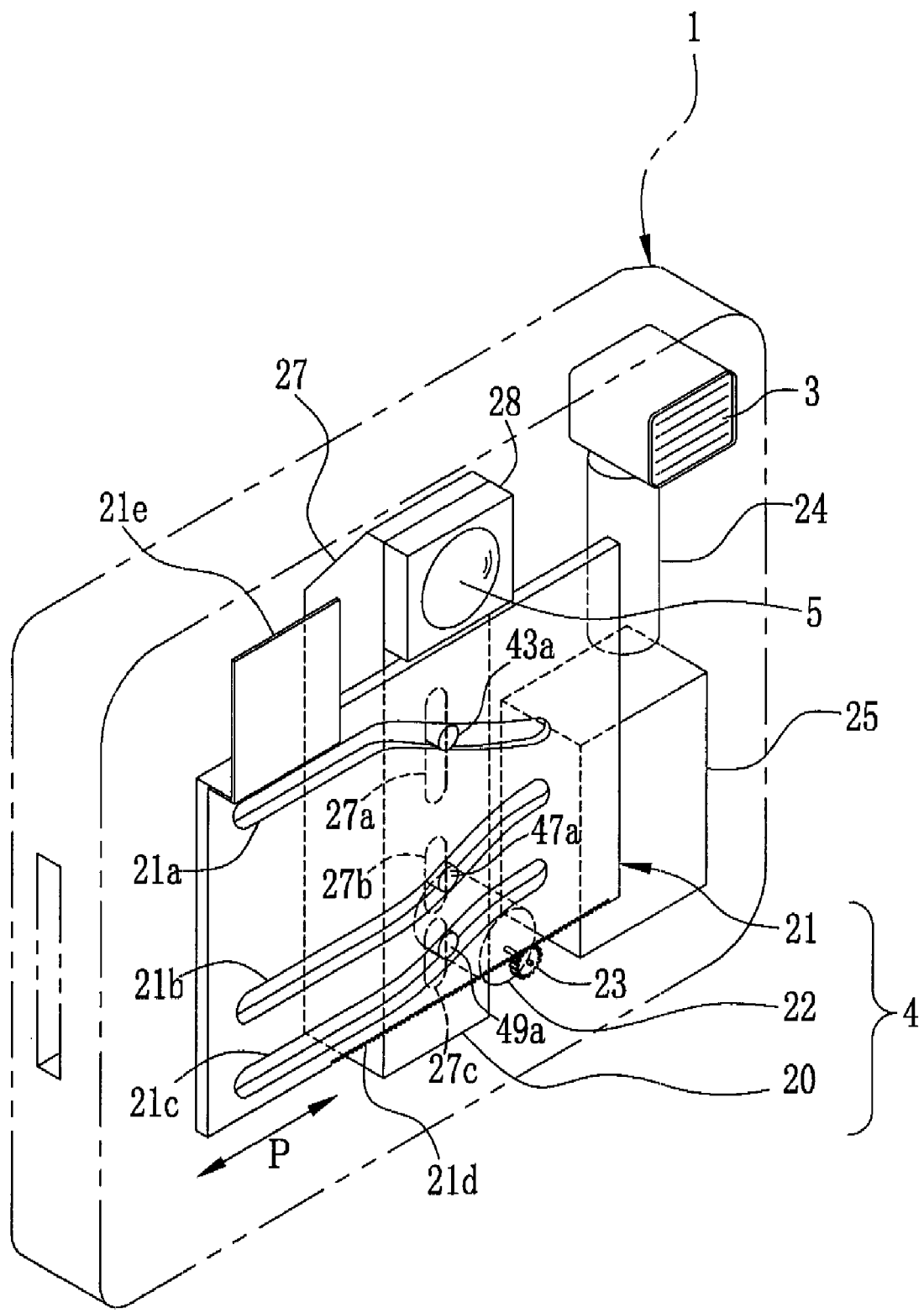
FIG. 3 is an explanation view illustrating an inside of the digital camera.

As shown in FIG. 1, a front side of a digital camera 1 includes an imaging aperture 2 and a flash device 3. The flash device 3 emits strobe light. Through the imaging aperture 2, an object-side lens 5 is exposed. The object-side lens 5 is a first lens group G1 of a zoom-type lens device 4 (see FIG. 3) incorporated in the digital camera 1.

A power button 6 and a release button 7 are arranged on a top side of the digital camera 1. A right side of the digital camera 1 includes a memory card slot 9. A memory card 8 is detachably inserted into the memory card slot 9. Image data of still picture and motion picture taken by the digital camera 1 is recorded on the memory card 8. Note that, as the memory card 8, smart media, xD-picture card (registered trade mark), and the like are used. Alternatively, image data may be recorded on an internal memory of the digital camera 1.

As shown in FIG. 2, a rear side of the digital camera 1 includes a liquid crystal display (LCD) 10, a zoom lever 11, a multi-purpose key 12, a mode changeover lever 13, and the like. The zoom lever 11 is used for zooming of the lens device 4 between a telephoto end (hereinafter referred to as T end) and a wide angle end (hereinafter referred to as W end). The multi-purpose key 12 is used for various operations for setting. By operating the multi-purpose key 12, while viewing a menu screen displayed on the LCD 10, the user can perform various settings such as turning on/off of strobe light emission.

When a knob 13a of the mode changeover lever 13 is slid, an operational mode of the digital camera 1 is switched in accordance with the position of the knob 13a. The operational mode includes a still picture imaging mode, a motion picture imaging mode, a reproducing mode for reproducing/displaying selected still picture or motion picture on the LCD 10.

In the imaging mode, the object image is displayed as a through image of the motion picture on the LCD 10. The user performs framing while viewing the through image. Moreover, in the reproducing mode, the image recorded on the memory card 8 is selected to be displayed on the LCD 10.

As shown in FIG. 3, the digital camera 1 incorporates the lens device 4, the flash device 3, and a condenser 24 for supplying electricity to the flash device 3. A battery container 25 for containing a battery is disposed under the condenser 24. The lens device 4 consists of a lens unit 20, a cam plate 21, and a motor 22.

A holder 28 for the object-side lens 5, which is attached to an uppermost portion of a case 27, protrudes forward compared with a front side of the case 27. The cam plate 21 drives third, fifth, and sixth movable lens groups G3, G5, and G6 housed in the case 27 along an optical axis L2 (see FIGS. 4 and 5) in the vertical direction.

Three cam slots 21a, 21b, and 21c are formed on the cam plate 21. The cam plate 21 is movable in the lateral direction (a direction indicated by the arrow P in the drawing) along the front side of the case 27. The cam plate 21 has a thickness so as not to protrude forward compared with the object-side lens 5. Therefore, the cam plate 21 does not protrude forward compared with the object-side lens 5 within the movable range thereof.

The cam slots 21a, 21b, and 21c respectively fit onto cam followers 43a, 47a, and 49a (see FIGS. 4 and 5) protruding from guide holes 27a, 27b, and 27c on the front side of the case 27. As described later, the cam followers 43a, 47a, and 49a are formed integral with lens holding frames for holding the third, fifth, and sixth lens groups G3, G5, and G6, respectively. Accordingly, the third, fifth, and sixth lens groups G3, G5, and G6 move along the optical axis L2 in accordance with the movement of the cam plate 21.

Further, a rack gear 21d is formed on a lower end side of the cam plate 21 so as to be meshed with a gear 23 of the motor 22. Accordingly, in accordance with the rotation of the motor 22, the cam plate 21 moves in the direction indicated by the arrow P. Note that, although not shown in the drawing, the digital camera 1 incorporates a holding member having channel-shaped grooves engaged with the upper and lower ends of the cam plate 21 when the cam plate 21 moves in the direction indicated by the arrow P.

An approximately L-shaped lens barrier 21e is formed integral with a part of the upper end of the cam plate 21. The lens barrier 21e covers the object-side lens 5 when the digital camera 1 is not used so as to protect the object-side lens 5 from dust and scratches.

Figure 4A:
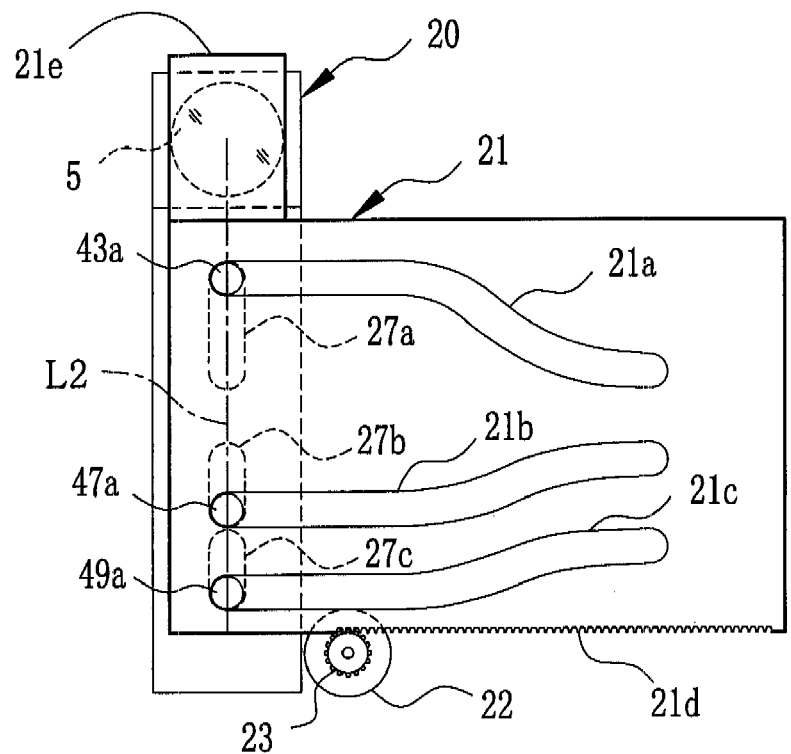
FIG. 4 is an explanation view illustrating a positional relationship between a cam plate and a lens unit, FIG. 4A showing the positional relationship when a power of the digital camera is in an off-state, FIG. 4B showing the positional relationship when a zoom position is at a wide angle end (W end), and FIG. 4C showing the positional relationship when a zoom position is at a telephoto end (T end)
Figure 4B:
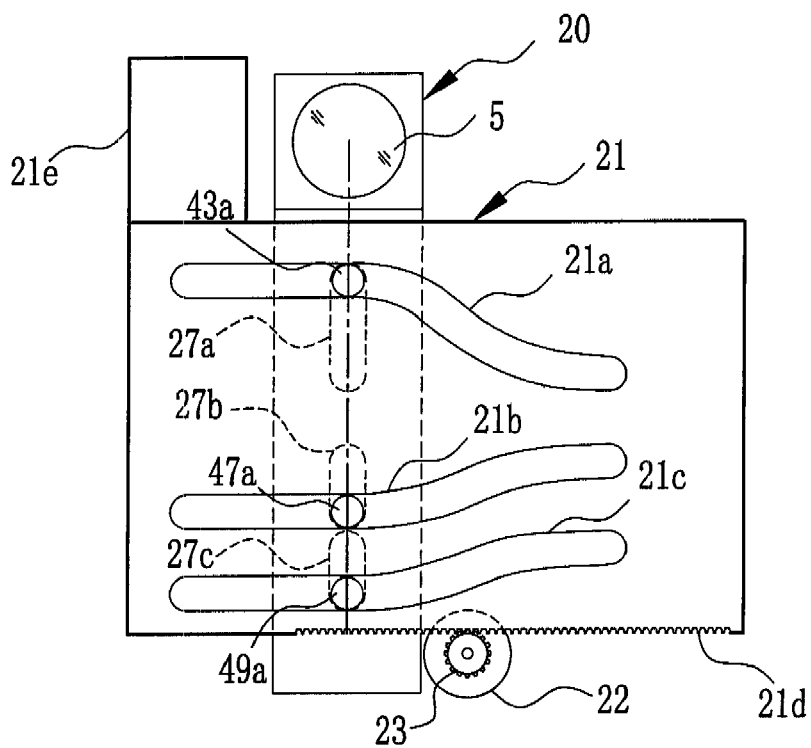

Next, the operation of the cam plate 21 is described. While the power of the digital camera 1 is in the off-state (when the digital camera 1 is not used), as shown in FIG. 4A, the cam plate 21 is a position in which the lens barrier 21e covers the object-side lens 5. When the power of the digital camera 1 is turned on, or when zooming is performed toward the W end, the cam plate 21 is positioned as shown in FIG. 4B. Further, when zooming is performed toward the T end, the cam plate 21 is positioned as shown in FIG. 4C.

Figure 4C:
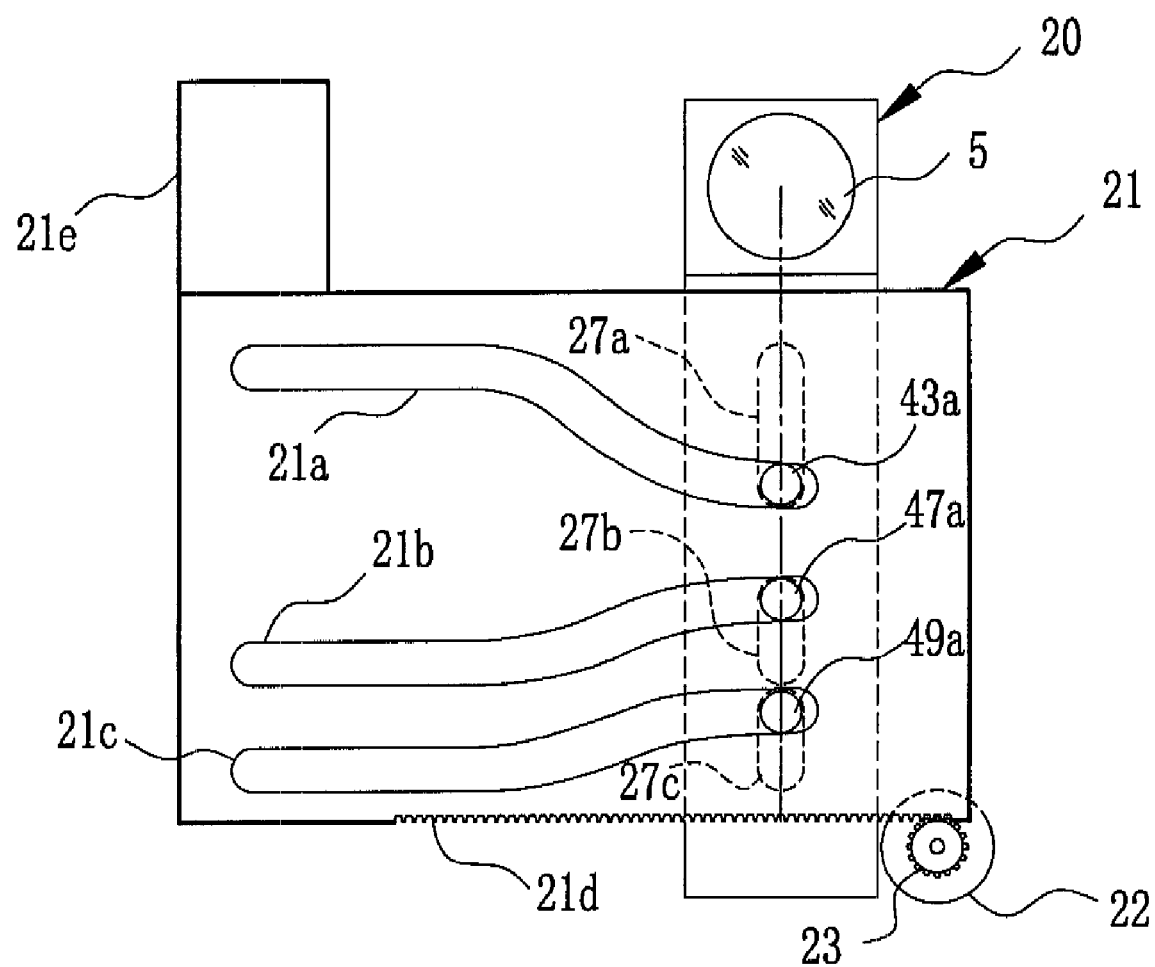

The cam plate 21 moves between the position shown in FIG. 4B and the position shown in FIG. 4C in accordance with zooming operation with use of the zoom lever 11. In accordance with the movement of the cam plate 21, the cam followers 43a, 47a, and 49a are respectively moved in the vertical direction by the cam slots 21a, 21b, and 21c in which they fit, along the guide holes 27a, 27b, and 27c. Thereby, the third, fifth, and sixth movable lens groups G3, G5, and G6 respectively move along the optical axis L2, and zooming and focusing of the lens unit 20 are performed. Note that the zoom position is defined at four positions, for example. After the cam plate 21 is stopped at any one of the defined positions, the cam plate 21 is slightly moved back, such that the fifth lens group (see FIG. 5) as the focusing lens is moved for the purpose of focusing.

When the power button 6 is operated to turn off the power of the digital camera 1, the cam plate 21 moves to the position shown in FIG. 4A. Note that cam slots 21a to 21c are horizontal in the position shown in FIG. 4A and the position shown in FIG. 4B. The positions of the third, fifth, and sixth movable lens groups G3, G5, and G6 while the power of the digital camera 1 is in the off-state are the same as those while the power of the digital camera 1 is in the on-state (while the zoom position is at the W end).

Figure 5:
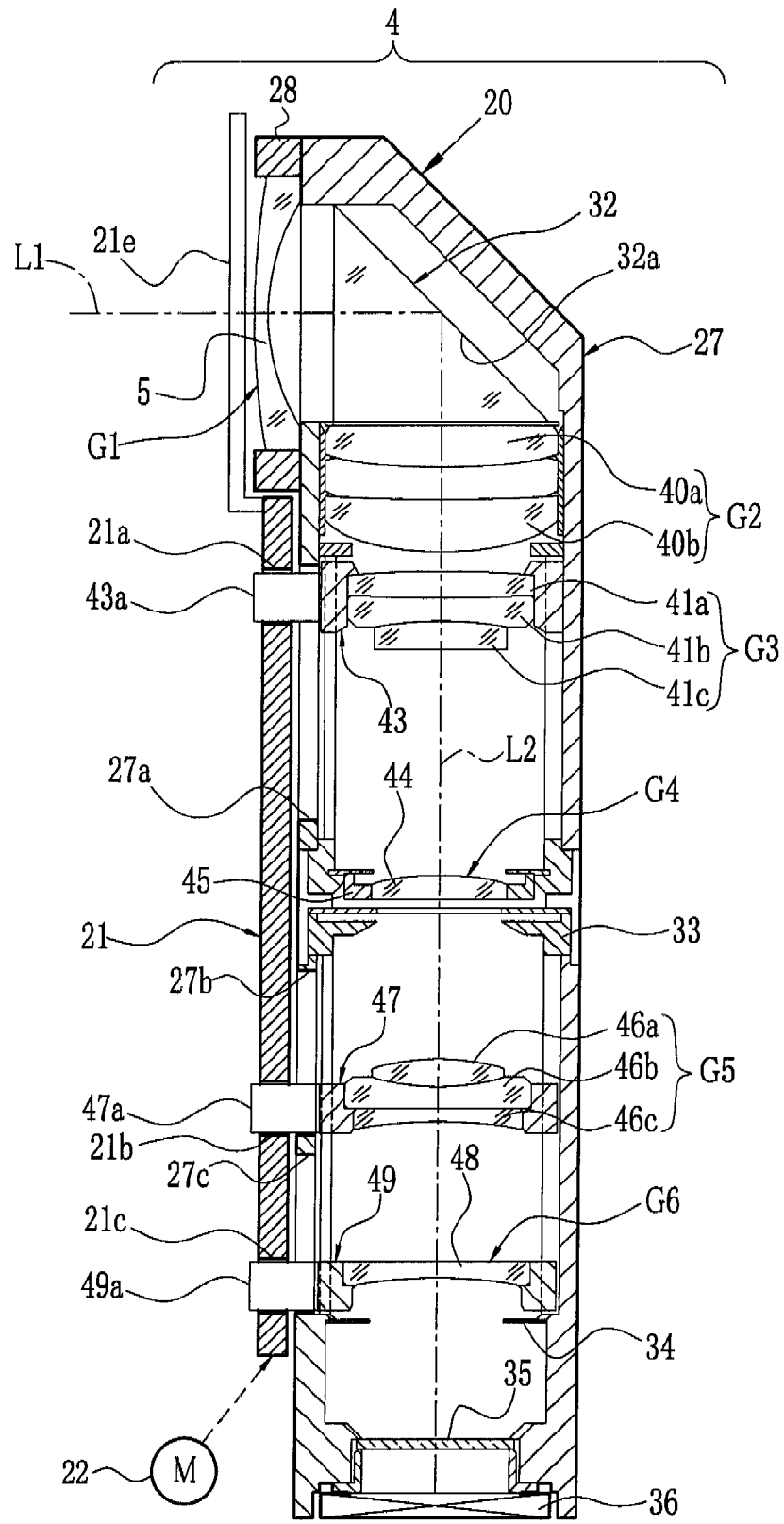
FIG. 5 is a cross sectional view showing the lens unit in the vertical direction when a zoom position is at the W end.
Figure 6:
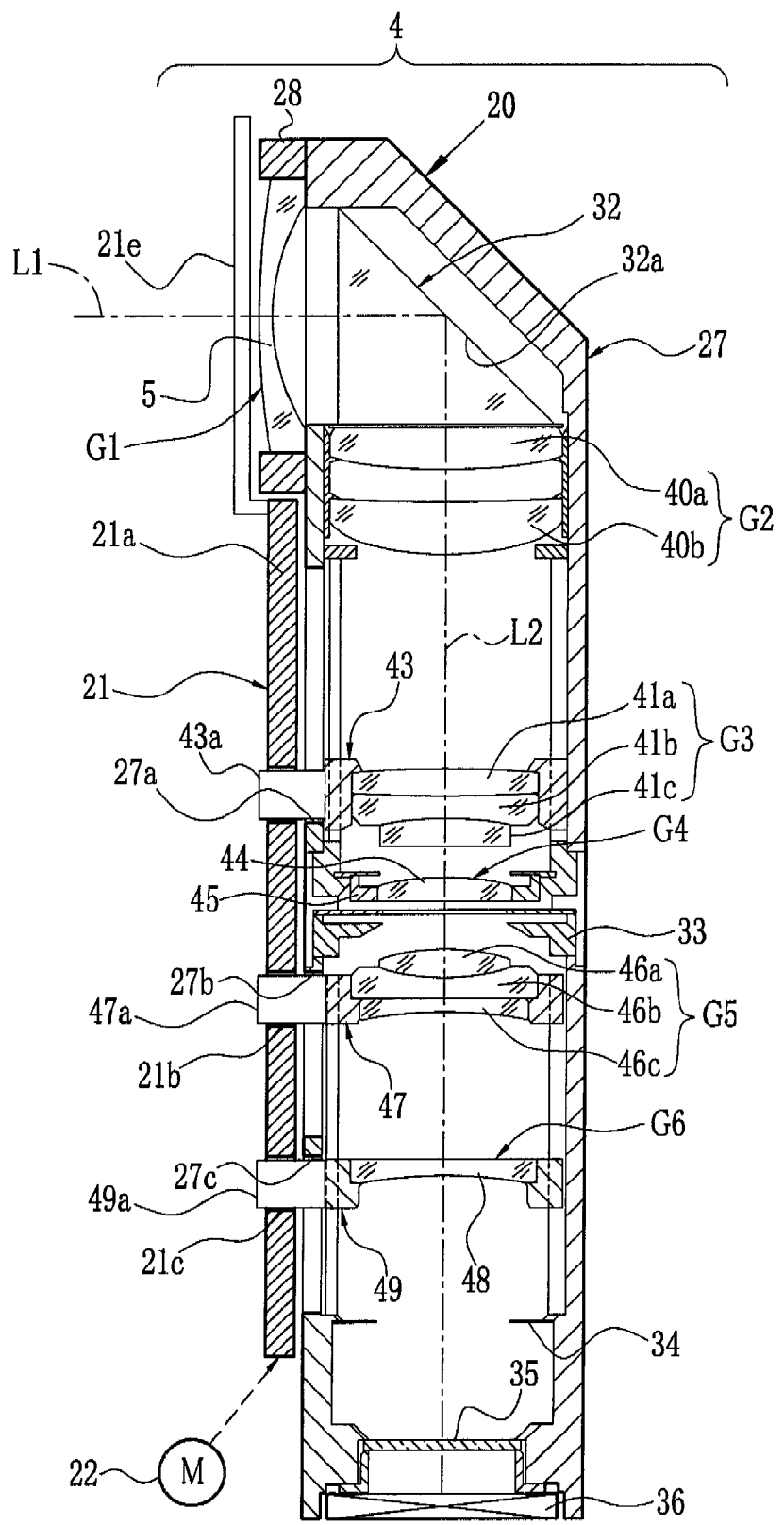
FIG. 6 is a cross sectional view showing the lens unit in the vertical direction when a zoom position is at the T end.

Next, the internal structure of the lens unit 20 is described. FIG. 5 shows the lens unit 20 when the zoom position is at the W end, and FIG. 6 shows the lens unit 20 when the zoom position is at the T end. The lens unit 20 includes first to sixth lens groups G1 to G6, a triangular prism (hereinafter abbreviated as prism) 32, a shutter device 33, a light shielding plate 34, an infrared ray cutting filter 35, a CCD image sensor (hereinafter abbreviated as CCD) 36, and the case 27 holding these components.

The first lens group G1 includes the object-side lens 5. At the back of the first lens group G1, there is disposed the prism 32 having a reflective surface 32a inclined by 45° with respect to an optical axis L1 of the object-side lens 5. The object light entering through the object-side lens 5 is reflected downward by the reflective surface 32a. A mirror may be used instead of the prism 32.

Below the prism 32, the second to sixth lens groups G2 to G6 as an imaging surface side lens groups are disposed along the optical axis L2 at an approximately right angle with the optical axis L1 of the object-side lens 5. The second lens group G2 just below the prism 32 consists of lenses 40a and 40b.

Below the second lens group G2, the third lens group G3 for zooming is positioned. The third lens group G3 consists of three lenses 41a, 41b, and 41c held by a third lens group holding frame 43. The cam follower 43a is integrally attached to the third lens group holding frame 43. The cam follower 43a protrudes forward from the guide hole 27a. As described above, since the cam follower 43a and the cam slot 21a are fit to each other, the third lens group G3 moves along the optical axis L2 in accordance with the movement of the cam plate 21.

Below the third lens group G3, the fourth lens group G4 is positioned. The fourth lens group G4 consists solely of a lens 44 held by a fourth lens group holding frame 45. The fourth lens group holding frame 45 is fixed inside the case 27. The shutter device 33 is disposed on the imaging surface side of the lens 44. The shutter device 33 has an aperture stop function.

Below the shutter device 33, the fifth lens group G5 as the focusing lens is positioned. The fifth lens group G5 consists of three lenses 46a, 46b, and 46c held by a fifth lens group holding frame 47. The cam follower 47a is integrally attached to the fifth lens group holding frame 47. The cam follower 47a protrudes forward from the guide hole 27b.

Below the fifth lens group G5, a sixth lens group G6 for zooming is positioned. The sixth lens group G6 consists solely of a lens 48 held by a sixth lens group holding frame 49. The cam follower 49a is integrally attached to the sixth lens group holding frame 49. The cam follower 49a protrudes forward from the guide hole 27c.

Below the sixth lens group G6, the light shielding plate 34, the infrared ray cutting filter 35, and the CCD 36 are fixed in this order. The light shielding plate 34 prevents occurrence of ghost and the like. Light enters through the object-side lens 5 and is bent by the prism 32 along the optical axis L2. Then, the bent light is focused on the imaging surface of the CCD 36 by the second to sixth lens groups G2 to G6 as the lens groups on imaging surface side.

Figure 7:
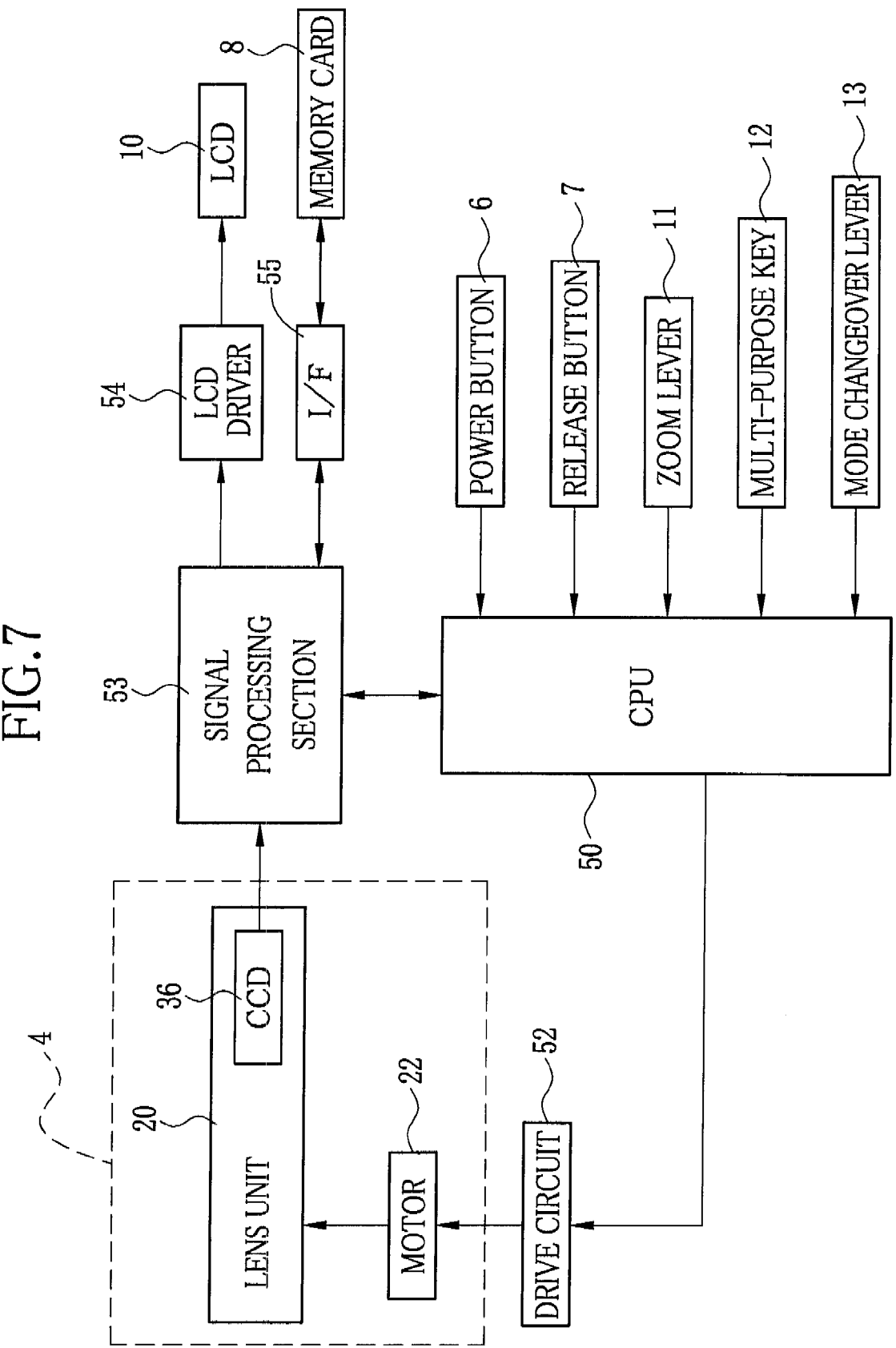
FIG. 7 is block diagram illustrating an electronic structure of the digital camera.

As shown in FIG. 7, there is disposed a central processing unit (CPU) 50 for controlling respective parts of the digital camera 1 based on operation signals from the release button 7, the zoom lever 11, the multi-purpose key 12, and the like. The drive circuit 52 drives the motor 22 of the lens device 4 under the control of the CPU 50.

The drive circuit 52 gives the motor 22 a rotation direction corresponding to the entry direction of the zoom lever 11 (W or T), and continues to give drive pulses to the motor 22 while the zoom lever 11 is in the on-state. The motor 22 is a stepping motor, and is caused to rotate in a normal or reverse direction by a predetermined times corresponding to the number of drive pulses supplied from the drive circuit 52.

The CCD 36 converts the object image formed by the lens device 4 to an analog imaging signal and outputs the imaging signal. Note that instead of the CCD 36, for example, an image sensor of complementary metal-oxide semiconductor (COMS) type may be used.

In an imaging mode, the signal processing section 53 subjects the field image (even field or odd field image) read from the CCD 36 to noise elimination, amplification, and conversion process into image data, and further to white balance and gamma (( ) correction. The processed field image is sequentially sent to the LCD driver 54. Thereby, the object image is displayed as the through image on the LCD 10. When the release button 7 is depressed in the imaging mode, the signal processing section 53 subjects the image data for one frame read from the CCD 36 to various kinds of image processing described above just after the depressing operation of the release button 7. Thereafter, the signal processing section 53 compresses the data, and records the compressed data on the memory card 8 via the interface (I/F) circuit 55.

In the reproducing mode, the image data is read from the memory card 8 via the I/F circuit 55, and the read image data is decompressed in the signal processing section 53 to be sent to the LCD driver 54. Thereby, the image recorded on the memory card 8 is displayed on the LCD 10.

The signal processing section 53 includes a circuit for detecting the brightness of the object and the contrast of the image data based on the image data. The signal processing section 53 sends information about the detected brightness and contrast to the CPU 50. The CPU 50 controls the shutter speed and aperture stop based on the information about the brightness of the object sent from the signal processing section 53, and performs control for the zoom adjustment based on the contrast information.

Next, the operation of the above embodiment is described. As shown in FIG. 4A, in the digital camera 1 in the off-state, the object-side lens 5 is covered by the lens barrier 21e so as to be protected from dust and the like. When the power button 6 is depressed and the digital camera 1 becomes the on-state, the motor 22 is driven by the drive circuit 52, and the cam plate 21 moves from the position shown in FIG. 4A to the position shown in FIG. 4B. Thereby, the lens barrier 21e covering the object-side lens 5 moves to expose the object-side lens 5, and the digital camera 1 is ready for imaging.

In the still picture or motion picture imaging mode, when the zoom lever 11 is depressed to the T end side, the motor 22 is driven and the cam plate 21 moves to the T end side as shown in FIG. 4C. In accordance with the movement of the cam plate 21, the cam followers 43a, 47a, and 49a respectively move by the cam slots 21a, 21b, and 21c along the guide holes 27a, 27b, and 27c. Thereby, the third, fifth, and sixth lens groups G3, G5, and G6 move along the optical axis to the T end side. When the zoom lever 11 is depressed to the W end side, the motor 22 is rotated in the reverse direction, and the third, fifth, and sixth lens groups G3, G5, and G6 move along the optical axis to the W end side as shown in FIG. 4B.

Upon stopping depression of the lever 11 at a desired timing, the drive circuit 52 causes the cam plate 21 to stop at one of the above described four positions which is nearest from the position of the cam plate 21 at the time. Then, the CPU 50 causes the motor 22 to rotate in the reverse direction without changing the zoom position, based on the contrast information from the signal processing section 53 for the purpose of focusing.

Upon detecting the depression of the release button 7, the CPU 50 opens/closes the shutter of the shutter device 33 at an appropriate timing to image a still picture. Note that, in the motion picture imaging mode, imaging is performed with the shutter open. The light entering through the object-side lens 5 is focused on the imaging surface (light receiving surface) of the CCD 36 along the optical axes L1 and L2 of the lens unit 20. The CCD 36 converts the focused optical image to an electric imaging signal, and sends the imaging signal to the signal processing section 53. The imaging signal is subjected to the various kinds of image processing and converted into the image data. The image data is further subjected to the data compression and recorded on the memory card 8.

When the power of the digital camera 1 is turned off upon depression of the power button 6, the motor 22 is driven, and the cam plate 21 moves to the position shown in FIG. 4A. Thereby, the object-side lens 5 is covered by the lens barrier 21e, and electric power supply from the battery is stopped.

As described above, according to the digital camera 1 of this embodiment, the third, fifth, and sixth movable lens groups G3, G5, and G6 can be driven by one motor 22 such that zooming and focusing are performed. Moreover, the cam plate 21 is disposed on the front side of the case 27 in a slidable manner, and does not protrude forward compared with the object-side lens 5. Accordingly, use efficiency of the internal space is excellent.

Although one cam plate is used for zooming and focusing in the above embodiment, it is also possible to use the cam plate for zooming only and use another drive system for focusing.

The present invention is applicable to the digital camera as an example of imaging devices, and further to other electronic devices having imaging mechanism, such as portable phones provided with a camera, laptop computers provided with a camera, and the like.

The present invention is not to be limited to the above embodiments, and on the contrary, various modifications will be possible without departing from the scope and spirit of the present invention as specified in claims appended hereto.

What is claimed is:

1. A lens device comprising:
   an object-side lens group;
   an optical device for bending an optical path passing through said object-side lens group at a right angle to form a vertical optical path;
   a lens group on imaging surface side disposed on said vertical optical path and for forming an image on an imaging surface, said lens group on imaging surface side moving along said vertical optical path and having a plurality of movable lens groups at least for zooming;
   a cam plate moving in a direction perpendicular to said vertical optical path within a plane perpendicular to an optical axis of said object-side lens group and not protruding toward an object side compared with said object-side lens group; and
   a plurality of cam slots formed on said cam plate and fit to a part of said plurality of movable lens groups, said cam slots moving said plurality of movable lens groups in accordance with movement of said cam plate.

2. A lens device as defined in claim 1, further comprising:
   a case for housing said lens group on imaging surface side; and
   a plurality of guide holes formed on said case so as to extend parallel to said vertical optical path, a part of said movable lens groups being fit to said cam slots through said guide holes.

3. A lens device as defined in claim 2, further comprising:
   a lens barrier formed on said cam plate, said lens barrier moving with said cam plate and opening/closing said object-side lens group.

4. A lens device as defined in claim 3, wherein said optical device is a triangular prism.

5. An imaging device comprising:
   an object-side lens group;
   an optical device for bending an optical path passing through said object-side lens group at a right angle to form a vertical optical path;
   a lens group on imaging surface side disposed on said vertical optical path and for forming an image on an imaging surface, said lens group on imaging surface side moving along said vertical optical path and having a plurality of movable lens groups at least for zooming;
   a cam plate moving in a direction perpendicular to said vertical optical path within a plane perpendicular to an optical axis of said object-side lens group and not protruding toward an object side compared with said object-side lens group;
   a plurality of cam slots formed on said cam plate and fit to a part of said plurality of movable lens groups, said cam slots moving said plurality of movable lens groups in accordance with movement of said cam plate; and
   an image sensor disposed on said imaging surface and for converting said image into an electric signal.

* * * * *